US008869161B2

(12) United States Patent
DePetro

(10) Patent No.: US 8,869,161 B2
(45) Date of Patent: Oct. 21, 2014

(54) CHARACTERIZATION AND ASSIGNMENT OF WORKLOAD REQUIREMENTS TO RESOURCES BASED ON PREDEFINED CATEGORIES OF RESOURCE UTILIZATION AND RESOURCE AVAILABILITY

(75) Inventor: Matthew James DePetro, Sunnyvale, CA (US)

(73) Assignee: Fujitsu Limited, Kawasaki-shi (JP)

( * ) Notice: Subject to any disclaimer, the term of this patent is extended or adjusted under 35 U.S.C. 154(b) by 631 days.

(21) Appl. No.: 12/949,494

(22) Filed: Nov. 18, 2010

(65) Prior Publication Data

US 2012/0131593 A1    May 24, 2012

(51) Int. Cl.
*G06F 9/50* (2006.01)
*G06F 9/46* (2006.01)

(52) U.S. Cl.
CPC .................................. *G06F 9/5088* (2013.01)
USPC ........... 718/104; 718/103; 718/100; 709/226; 709/223

(58) Field of Classification Search
None
See application file for complete search history.

(56) References Cited

U.S. PATENT DOCUMENTS

| | | | |
|---|---|---|---|
| 8,136,114 B1 * | 3/2012 | Gailloux et al. | 718/104 |
| 8,214,836 B1 * | 7/2012 | Markov | 718/103 |
| 2003/0208470 A1 * | 11/2003 | MacLellan et al. | 707/1 |
| 2005/0055590 A1 * | 3/2005 | Farkas et al. | 713/320 |
| 2005/0081208 A1 * | 4/2005 | Gargya et al. | 718/100 |
| 2005/0283786 A1 * | 12/2005 | Dettinger et al. | 718/104 |
| 2006/0155633 A1 * | 7/2006 | Fellenstein et al. | 705/37 |
| 2007/0150599 A1 * | 6/2007 | Neogi et al. | 709/227 |
| 2008/0066072 A1 * | 3/2008 | Yurekli et al. | 718/104 |
| 2008/0086734 A1 * | 4/2008 | Jensen et al. | 718/104 |
| 2008/0235703 A1 * | 9/2008 | Crawford et al. | 718/104 |
| 2009/0083717 A1 * | 3/2009 | Branson et al. | 717/130 |
| 2009/0178045 A1 * | 7/2009 | Gupta et al. | 718/103 |
| 2009/0240476 A1 * | 9/2009 | Kshirsagar et al. | 703/2 |
| 2010/0058347 A1 * | 3/2010 | Smith et al. | 718/104 |
| 2010/0082321 A1 * | 4/2010 | Cherkasova et al. | 703/22 |
| 2010/0169892 A1 * | 7/2010 | Stam et al. | 718/105 |
| 2010/0275212 A1 * | 10/2010 | Saha et al. | 718/104 |
| 2010/0306379 A1 * | 12/2010 | Ferris | 709/226 |
| 2011/0154350 A1 * | 6/2011 | Doyle et al. | 718/104 |
| 2011/0247003 A1 * | 10/2011 | Fong et al. | 718/104 |
| 2012/0096468 A1 * | 4/2012 | Chakravorty et al. | 718/103 |
| 2012/0192188 A1 * | 7/2012 | Ferdous et al. | 718/101 |

* cited by examiner

*Primary Examiner* — Emerson Puente
*Assistant Examiner* — Benjamin Wu
(74) *Attorney, Agent, or Firm* — Baker Botts L.L.P.

(57) ABSTRACT

A method for managing computing resources includes generating a first workload metadata for a first workload, generating a second workload metadata for a second workload, and comparing the first workload and the second workload metadata against resource metadata. The method includes, based upon the comparison of workload metadata against resource metadata, identifying a potential conflict in resource requirements between the first workload and the computing resources available to the processing entity, and assigning the second workload for execution by one of the processing entities. The metadata characterize computing resources required by the associated workload. The first workload metadata is initially prioritized over the second workload metadata. The workloads are to be executed by processing entities. The resource metadata is available to the processing entities. The potential conflict in resource requirements does not exist between the resource requirements of the second workload and the computing resources of the processing entity.

28 Claims, 6 Drawing Sheets

FIG. 6

| NODE OPERATION STATUS CURRENT USAGE: | CPU₀ — 206 | CPU₁ — 206 | NODE TO NODE BANDWIDTH — 205 | POWER USAGE LIMITS — 207 | AVAILABLE SYSTEM MEMORY — 204 | I/O CONNECTION — 208 | ← 602 |
|---|---|---|---|---|---|---|---|
| | 85% | 0% | 2 gbps | 300 W | 384 GB | 0.5 gbps | |
| MAX CAPACITY: | 100% | 100% | 10 gbps | 600 W | 512 GB | 5 gbps | |

| WORKLOAD QUEUE | | CPU RESOURCES — 206 | NODE TO NODE BANDWIDTH — 205 | POWER USAGE LIMITS — 207 | SYSTEM MEMORY — 204 | I/O CONNECTION — 208 | |
|---|---|---|---|---|---|---|---|
| TOP OF QUEUE | WORKLOAD A | 70% | 10 gbps | NONE | 256 GB | 1.5 gbps | ← 606 |
| | WORKLOAD B | 85% | 1 gbps | NONE | 64 GB | 2.0 gbps | ← 606 |
| | WORKLOAD C | 10% | 6 gbps | NONE | 32 GB | 0.5 gbps | ← 606 / 604 |
| END OF QUEUE | WORKLOAD D | 90% | 7 gbps | NONE | 112 GB | 0.5 gbps | ← 606 |

CHARACTERIZATION AND ASSIGNMENT OF WORKLOAD REQUIREMENTS TO RESOURCES BASED ON PREDEFINED CATEGORIES OF RESOURCE UTILIZATION AND RESOURCE AVAILABILITY

TECHNICAL FIELD OF THE INVENTION

The present invention relates generally to computing resource management, and, more particularly, to a system and method for computing workload metadata generation, analysis, and utilization.

BACKGROUND

To improve computing performance, systems and electronic devices, such as computers, now employ large quantities of computing electronic devices, central processing units ("CPUs"), and CPU cores. Managing such resources may be a complex and difficult task. Software configured to assign and prioritize workload requests for execution on such resources may take a reactive approach that distributes computing resources based upon current demand.

SUMMARY

A method for managing computing resources includes generating a first workload metadata for a first workload, generating a second workload metadata for a second workload, comparing the first workload and the second workload metadata against resource metadata. The method includes, based upon the comparison of workload metadata against resource metadata, identifying a potential conflict in resource requirements between the first workload and the computing resources available to the processing entity, and assigning the second workload for execution by one of the processing entities. The first workload and the second workload metadata each characterize computing resources required by the associated workload. The first workload metadata is initially prioritized over the second workload metadata. The first workload and the second workload are to be executed by processing entities. The resource metadata characterizing the computing resources is available to the processing entities. The potential conflict in resource requirements does not exist between the resource requirements of the second workload and the computing resources available to the processing entity.

In a further embodiment, an article of manufacture includes a computer readable medium and computer-executable instructions. The computer-executable instructions are carried on the computer readable medium. The instructions are readable by a processor. The instructions, when read and executed, cause the processor to generate a first workload metadata for a first workload, generate a second workload metadata for a second workload, compare the first workload metadata and second workload metadata against resource metadata, identify a potential conflict in resource requirements between the first workload and the computing resources available to the processing entity based upon the comparison of workload metadata against resource metadata, and assign the second workload for execution by one of the processing entities. The first workload metadata and second workload metadata each characterize computing resources required by the workload. The first workload metadata is initially prioritized over the second workload metadata. The first workload and the second workload are to be executed by one or more processing entities. The resource metadata characterizes the computing resources available to the one or more processing entities. The potential conflict in resource requirements does not exist between the resource requirements of the second workload and the computing resources available to the processing entity.

In yet another embodiment, a system for managing computing workloads includes a processor, a computer readable medium coupled to the processor, and computer-executable instructions carried on the computer readable medium. The instructions are readable by the processor. The instructions, when read and executed, cause the processor to generate a first workload metadata for a first workload, generate a second workload metadata for a second workload, compare the first and second workload metadata against resource metadata, identify a potential conflict in resource requirements between the first workload and the computing resources available to the processing entity based upon the comparison of workload metadata against resource metadata, and assign the second workload for execution by one of the processing entities. The first and second workload metadata each characterize computing resources required by the workload. The first workload and the second workload are to be executed by one or more processing entities. The resource metadata characterize the computing resources available to the one or more processing entities. The potential conflict in resource requirements does not exist between the resource requirements of the second workload and the computing resources available to the processing entity.

BRIEF DESCRIPTION OF THE DRAWINGS

For a more complete understanding of the present invention and its features and advantages, reference is now made to the following description, taken in conjunction with the accompanying drawings, in which:

FIG. 6 is an example illustration of quantitative categorization and prioritization by a workload characterizer and a workload manager.

DETAILED DESCRIPTION

Figure 1:
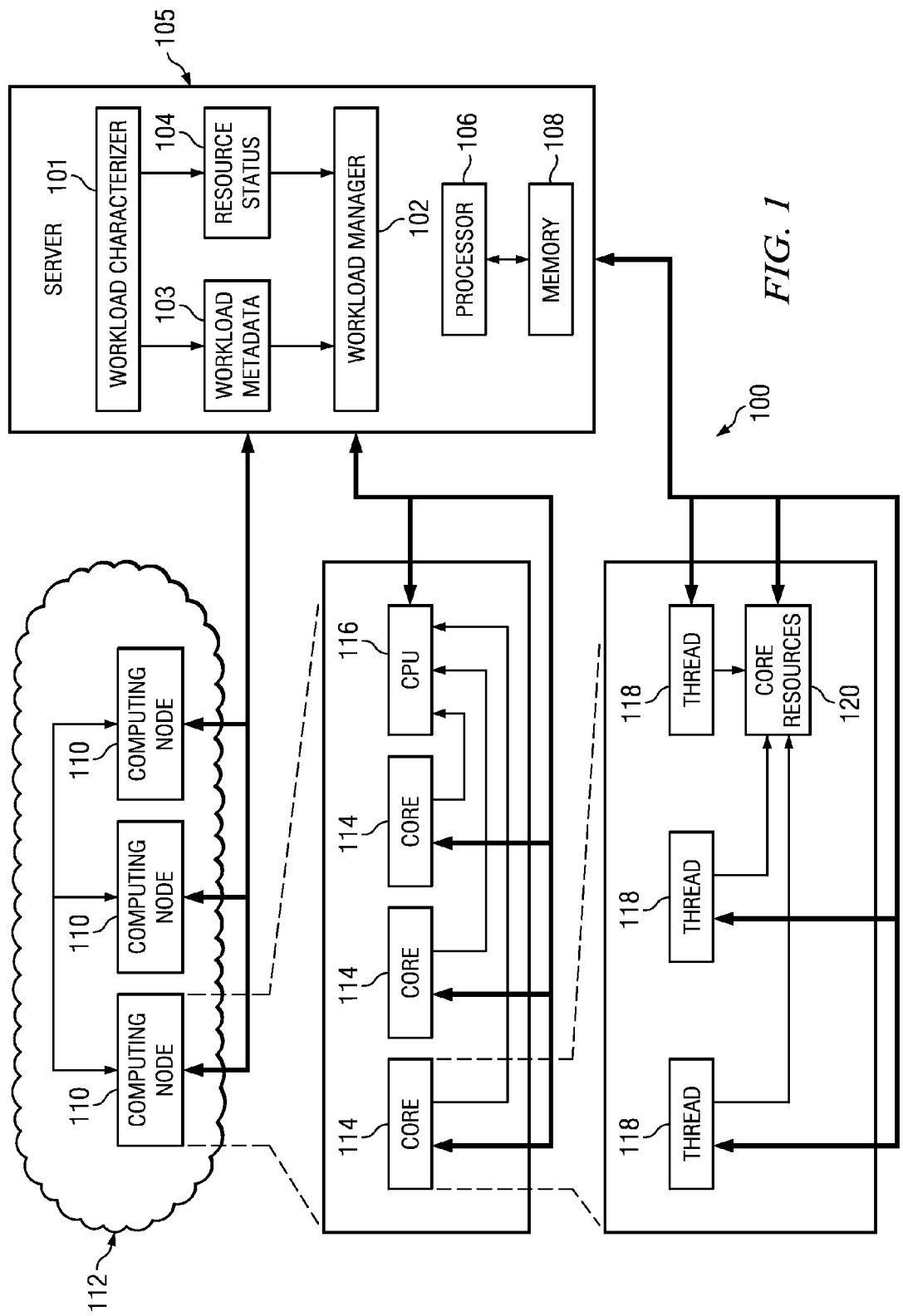
FIG. 1 is an example embodiment of a system for computing workload metadata generation analysis and utilization.

FIG. 1 is an example embodiment of a system 100 for computing workload metadata generation analysis and utilization. System 100 may include a workload characterizer 101 and a workload manager 102. System 100 may include one or more computing nodes 110. Computing nodes 110 may include a processor, and may be implemented in, for example, electronic devices, computers, servers, or motherboards. Such devices may include more than one computing node 110, such as a rack-mount server configuration, containing multiple blade server boards, each board containing a computing node. In a multi-processor environment, each of the processors may be represented by a computing node 110. System 110 may include one or more cores 114. A core 114 may be implemented in a portion of a processor configured to perform reading and executing of an instruction. A processor, or computing node 110, may include one or more cores 114. System 110 may include one or more threads 118. A thread 118 may be implemented in a sequence of instructions that can be scheduled by, for example, an operating system for execution on a core 114 or computing node 118. Core 114 may include one or more threads 118.

Workload characterizer 101 may be configured to evaluate the operation of one of more computing or processing entities, such as computing nodes 110, cores 114 or threads 118. A set of computing or processing tasks to be completed by a processing entity may be bundled together in a workload. A computing or processing entity may be configured to execute one or more workloads in parallel. Such a configuration may cause a scarcity of computing resources for, which workloads being executed in parallel must share. Workload characterizer 101 may be configured to determine the resources necessary for a workload to be processed on a processing entity. Workload characterizer 101 may be configured to evaluate the total resources available for all of the processing entities at a given level to use. Workload characterizer may measure the required computing resources needed for workloads in various levels of processing entities in system 100. Workload characterizer 101 may be configured to record the results of such a measurement and attach them to the workload in the form of characteristic metadata. Workload manager 102 may be configured to use such recorded metadata information in order to assign and prioritize workloads for execution by the processing entities. In one embodiment, workload manager 102 may assign and prioritize workloads for simultaneous execution by the processing entities.

Workload characterizer 101 may be implemented in any script, executable, module, library, or other suitable digital entity for execution for characterizing the resource requirements of a workload in system 100. Workload manager 102 may be implemented in any script, executable, module, library, or other suitable digital entity for assigning and prioritizing workloads for execution. Workload characterizer 101 may reside on any electronic device of system 100 suitable for hosting workload characterizer 101. Workload manager 102 may reside on any electronic device of system 100 suitable for hosting workload manager 102. In one embodiment, workload characterizer 101 and workload manager 102 may reside on the same electronic device. In another embodiment, workload characterizer 101 and workload manager 102 may reside on different electronic devices. Workload characterizer 101 and workload manager 102 may reside on one or more servers 105. Server 105 may be implemented by an electronic device of system 100. Server 105, or the electronic device upon which workload characterizer 101 or workload manager 102 is residing, may include a processor 106 coupled to a memory 108. Workload characterizer 101 may be configured to be executed by processor 106 and stored in memory 108. Workload manager 102 may be configured to be executed by processor 106 and stored in memory 108. In one embodiment, workload characterizer 101 and workload manager 102 may be implemented in the same executable, script, file, module or library. In another embodiment, workload characterizer 101 and workload manager 102 may be implemented in different executables, scripts, files, modules, or libraries.

Processor 106 may comprise, for example a microprocessor, microcontroller, digital signal processor (DSP), application specific integrated circuit (ASIC), or any other digital or analog circuitry configured to interpret and/or execute program instructions and/or process data. In some embodiments, processor 106 may interpret and/or execute program instructions and/or process data stored in memory 108. Memory 106 may be configured in part or whole as application memory, system memory, or both. Memory 106 may include any system, device, or apparatus configured to hold and/or house one or more memory modules. Each memory module may include any system, device or apparatus configured to retain program instructions and/or data for a period of time (e.g., computer-readable media).

Workload characterizer 101 may be configured to generate workload metadata 103. Workload characterizer 101 may be configured to analyze the status of resources of system 100 and characterize them in resource status 104. Workload manager 102 may be configured to access workload metadata 103 and/or resource status 104. Workload manager may be configured to use workload metadata 103 and resource status 104 to prioritize and assign the execution of workloads on processing entities of system 100.

Workload characterizer 101 may be configured to characterize the workloads and resources of processing entities from various levels of system 100. For example, workload characterizer 101 may be configured to analyze the workload and resource characteristics of one or more computing nodes 110. Computing nodes 110 may be configured to communicate via a network 112. Network 112 may be implemented in any suitable network for communication, such as: the Internet, an intranet, wide-area-networks, local-area-networks, backhaul-networks, peer-to-peer-networks, or any combination thereof.

In another embodiment, workload characterizer 101 may be configured to analyze the workloads and resources of one or more cores 114 in a given processing unit such as computing node 110. Such cores may be each running in a single computing node 110, or more than one core may be running in a single computing node. In yet another embodiment, workload characterizer 101 may be configured to analyze the workloads and resources of one or more threads 118. Such threads may each be running in a single core 114, or more than one thread may be running in a single CPU. Such threads may be running simultaneously for parallel execution by cores 114, CPU, or other processing entity.

In each of these embodiments, the processing entities may have a limited amount of system resources. Such resources may vary by the kind of processing entities which are trying to share the resources. For example, cores 114 may try to share access to CPU 116 and other computing node 110 resources. In another example, threads 118 may be configured to share core resources 120 or other portions of a core 114. Workload characterizer 101 and workload manager 102 may be communicatively coupled to computer computing nodes 110, cores 114, threads 118, as well as the resources of each level, such as CPU 116 or core resources 120. Workload characterizer 101 may be configured to analyze the available resources of a given level. For example, workload characterizer 101 may be configured to analyze the resources available to computing nodes 110. In another example, workload characterizer 101 may be configured to analyze the resources available to cores 114 such as CPU 116. In another example, workload characterizer 101 may be configured to analyze the resources available to threads 118, such as core resources 120. Workload characterizer may be configured to compile the results of such analysis into resource status 104.

Workload manager 102 may be configured to access workload metadata 103 and resource status 104 to determine the priority of execution of the processing entities of a given level.

Figure 2:
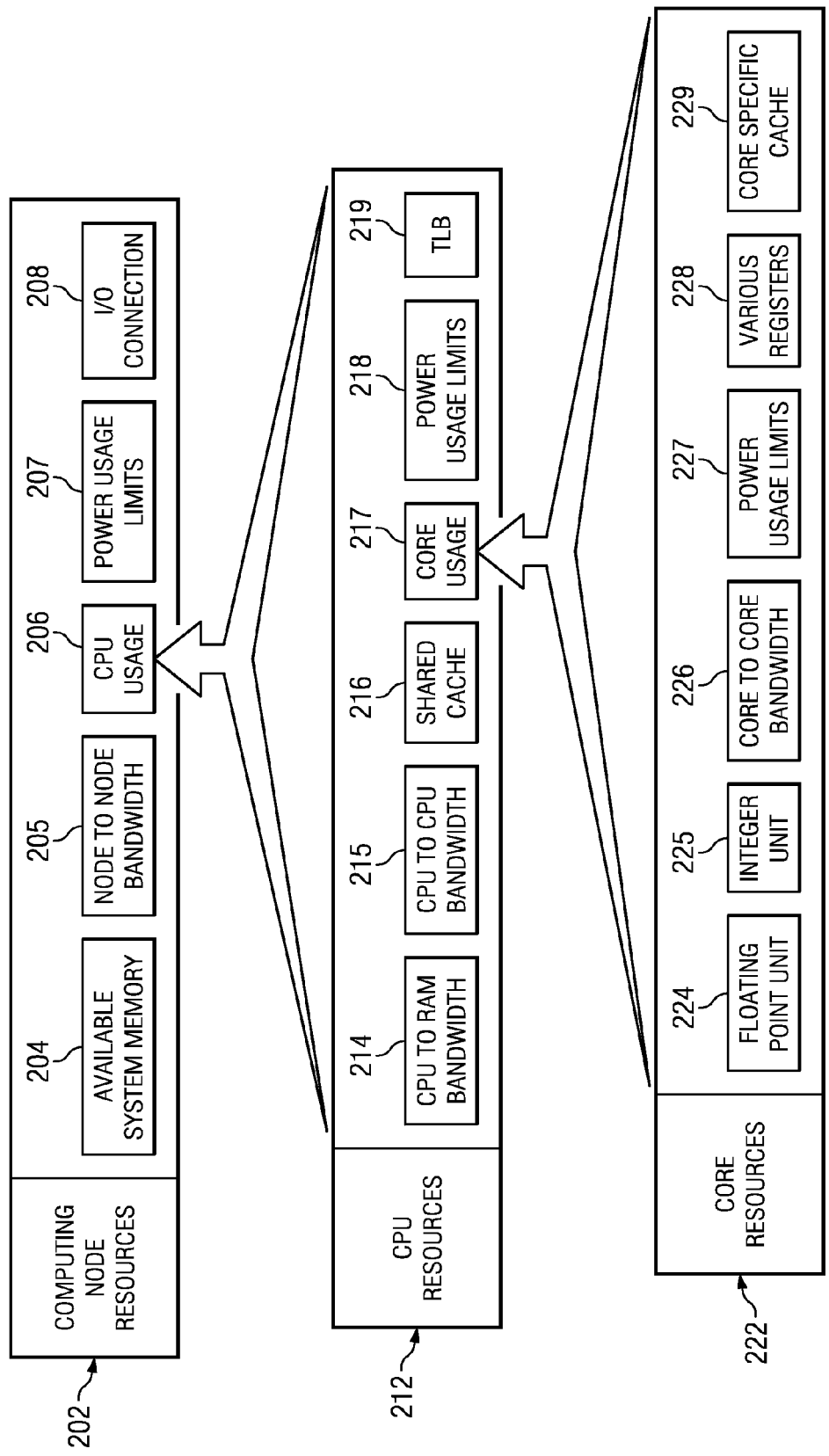
FIG. 2 is an illustration of example system resources that may be characterized by a workload characterizer and utilized by a workload manager to prioritize execution of workloads by processing entities in system.

FIG. 2 is an illustration of example system resources that may be characterized by workload characterizer 101 and utilized by workload manager 102 to prioritize execution of workloads by processing entities in system 100. Such resources may be divided into different levels according to the nature of processing entities. For example, computing node resources 202 may represent the system resources available to computing nodes 110. In another example, CPU resources 212 may represent the resources available for cores 114. In yet another example, core resources 222 may represent the resources available for execution by threads 118.

Computing node resources 202 may include any resources useful for computing nodes 110 to execute. Such computing node resources may include, for example, available system memory 204, node-to-node bandwidth 205, CPU usage of a given computing node 206, power usage limits 207, and/or I/O connection 208.

CPU resources 212 may include any resources suitable for cores 114 to execute. Such resources may include, but is not limited to: CPU-to-RAM bandwidth 214, CPU-to-CPU bandwidth 215, shared cache 216, core usage 217, power usage limits 218, and/or translation look-aside buffer ("TLB") 219. CPU resources 212 may represent the CPU usage 206 of a given computing node 110.

Core resources 222 may include any system resources suitable for threads 118 to execute. Such resources may include, but are not limited to, floating point unit 224, integer unit 225, core-to-core bandwidth 226, power usage limits 227, various registers 228, and core specific cache 229. Core resources 222 may make up core usage 217 of a given core in CPU resources 212.

Figure 3:
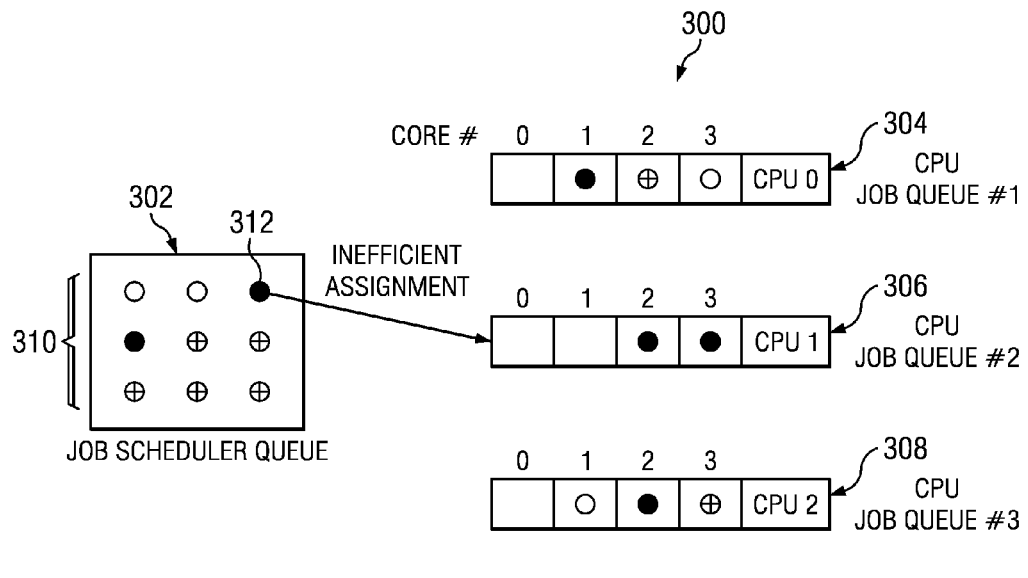
FIG. 3 is an illustration of how workloads arising from a system may be inefficiently assigned to various processing units of the system.

FIG. 3 is an illustration of how workloads arising from system 100 may be inefficiently assigned to various processing units of system 100. A job scheduler queue 302 may include one or more jobs 310 or workloads that are to be executed in system 100. Job scheduler queue 302 may be maintained by workload manager 102. In the example of FIG. 3, job scheduler queue 302 may contain various work jobs for execution on one or more available CPUs 116. Three CPUs may be available for execution: $CPU_0$, $CPU_1$, and $CPU_2$. Each CPU may have an associated job queue 304-308. For example, $CPU_0$ may correspond to CPU Job Queue #1 304, $CPU_1$ may correspond to CPU Job Queue #2 306, and $CPU_2$ may correspond to CPU Job Queue #3 308. Each of the job queues 304-308 may have one or more workloads scheduled to execute on the specified CPU. Workload manager 102 may be configured to assign a workload 312 from job scheduler queue 302 to one or more of the available job queues 304-308. If workload manager does not have access to workload metadata 103 or resource status 104, workload manager 102 may not have the information that a given job may stress, or require significant resources of, a particular resource available to the pool of processing entities. For example, some of workloads 310 may especially stress CPU-to-RAM bandwidth, others may stress the shared cache, and yet others may stress the CPU-to-CPU interconnect. Further, each of CPU job queues 302-308 may be loaded with workloads of different types.

Without information about the nature of the workloads already loaded in CPU job queues 304-308, and of the nature of the workloads 312 to be assigned from job scheduler queue 310, workload manager 102 may not make an efficient assignment of a workload 312 from job scheduler queue 310 to a given CPU job queue. For example, among CPU job queues 304-308, CPU Job Queue #2 may have only two workloads assigned for execution. Since CPU Job Queue #2 has the least number of workloads pending, it may be designated to receive the next workload to be assigned to a queue. However, such workloads may both be workloads that would significantly consume CPU-to-RAM bandwidth. Workload scheduler 302 may be deciding which CPU job queue to assign a workload 310 that also greatly consumes CPU-to-RAM bandwidth, which workload manager 102 may inefficiently assign, sending such a workload to CPU Job Queue #2 instead of CPU Job Queue #1 or CPU Job Queue #3. Workload manager 102 may only be able to determine that CPU Job Queues #1 and #3 have three pending workloads for execution, without being able to determine that even though such queues have more workloads than CPU Job Queue #2, they would be able to process the workload 312 more efficiently.

Figure 4:
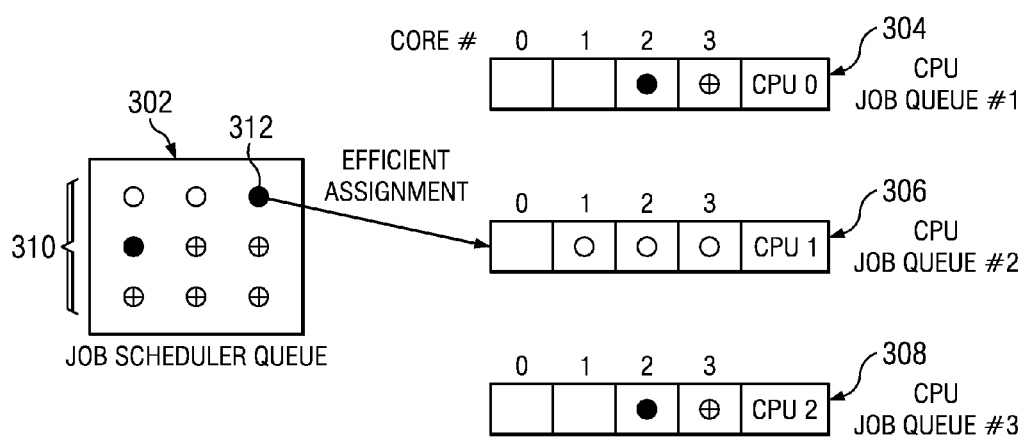
FIG. 4 is an example embodiment of an efficient assignment scheme by which a workload manager may assign pending workloads to a job queue.

FIG. 4 is an example embodiment of an efficient assignment scheme by which workload manager 102 may assign pending workloads to a job queue. In such an example, workload manager 102 may have access to information such as workload metadata 103 and resource status 104 by which workload manager 102 may efficiently assign a workload 310 to a job queue 304-308. For example, CPU Job Queue #2 may have three workloads pending, more than either CPU Job Queue #1 or CPU Job Queue #3. Workload manager 102 may be configured to determine which of the job queues to assign a given workload 310, and to avoid resource conflicts during such an assignment. For example, the workload 310 may consume significant CPU-to-RAM bandwidth resources. By using information in workload metadata 103 and resource status 104, workload manager 102 may ascertain the nature of the workloads already waiting in each of the job queues 304-308 as well as the metadata of the workload 310. Consequently, workload manager 102 may be configured to assign the pending workload 310 to CPU Job Queue #2, even though that queue has more jobs waiting for execution than CPU Job Queue #1 or CPU Job Queue #3. Workload manager 102 may be configured to make such an assignment because CPU Job Queues #1 and #2 may both already have pending workloads for execution that stress CPU-to-RAM bandwidth. In one embodiment, workloads 310 may be executed by a processing entity in parallel.

Returning to FIG. 1, workload characterizer 101 may be configured to characterize the workload of a processing entity of system 100 in any suitable manner. Workload characterizer may characterize any suitable resource, including but not limited to the resources as shown in FIG. 2. In one embodiment, workload characterizer 101 may be configured to load a pending workload from a processing entity of system 100 on a suitable electronic device to profile and characterize the resource utilization of the workload. Workload characterizer 101 may be configured to execute each workload to be characterized multiple times using different sample data to average the workload's resource consumption levels. Workload characterizer 101 may be configured to perform such characterization based on the specifications of system 100. For example, if workload characterizer 101 analyzed a given workload that used 80% of CPU memory bandwidth, workload characterizer 101 may be configured to make such a determination because the available CPU memory bandwidth consisted of 20 gigabits per second ("Gbps") and the workload was using 16 GB/s of CPU memory bandwidth. Using such techniques workload characterizer 101 may be configured to characterize workloads based upon the needs of a given workload. Workload characterizer 101 may be configured to identify resources responsible for bottlenecks.

In one embodiment, workload characterizer 101 may be configured to analyze the requirements of various workloads and the resources available to processing entities in a qualitative or relative manner. In such an embodiment, workload manager 102 may be configured to prioritize the execution of workloads based upon such relative information from workload metadata 103 and resource status 104. In another embodiment, workload characterizer 101 may be configured to analyze the requirements of various workloads and the resources available to processing entities in a quantitative manner. In such an embodiment, workload manager 102 may be configured to prioritize execution of workloads based on quantitative information from workload metadata 103 and resource status 104.

Figure 5:
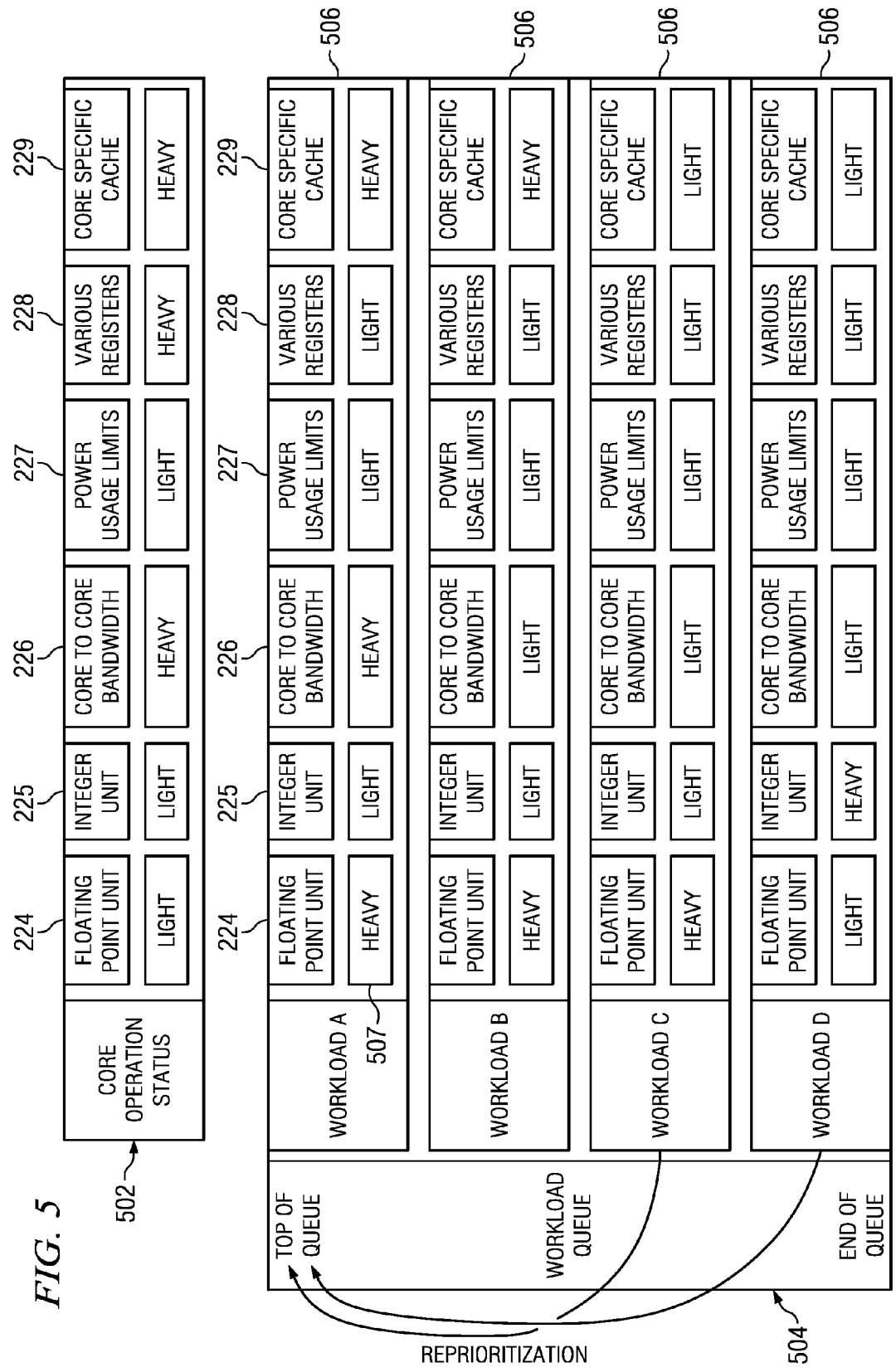
FIG. 5 is an example illustration of the generation of workload metadata and resource status in a qualitative or relative manner by a workload characterizer, so that a workload manager may prioritize execution.

FIG. 5 is an example illustration of the generation of workload metadata 103 and resource status 104 in a qualitative or relative manner by workload characterizer 101, so that workload manager 102 may prioritize execution. Core operation status 502 may be representative of the status of the resources available at a given level of system 100. Core operation status 502 may include resource requirements of workloads already assigned to execution by processing entities. Workload queue 504 may include workloads requested for execution by various processing entities of a given level of system 100. Workload queue 504 may contain one or more workloads 506. The resource information of a given workload 506 or of cooperation of status 502 may be configured to be set by workload characterizer 101. Such resource information may correspond to workload metadata 103 and resource status 104. Workload characterizer 101 may be configured to characterize the information of a given workload 506 qualitatively. Workload characterizer 101 may be configured to characterize the information of a given workload relative to, for example, a benchmark, information of other workloads, or to available system resources. Workload characterizer 101 may be configured to characterize the resource demands of a given workload into any suitable segmentation.

For example, workload characterizer 101 may be configured to characterize the resources needed by a given workload 506 into one or more possible categories of usage, such as either heavy usage or light usage. Similarly, workload characterizer 101 may be configured to characterize the status of the operation of one or more processing entities into one or more possible categories of usage. For example, workload characterizer 101 may be configured to characterize the resources available in a core in core operation status 502 as light usage or heavy usage. Workload characterizer 101 may be configured to determine such characterizations for each of the workloads 506 in a workload queue 504. For example, in FIG. 5, workload characterizer 101 may be configured to determine that a given core represented by core operation status 502, may be lightly used in terms of its resources associated with floating point unit 224, energy unit 225, power usage limits 227; workload characterizer 101 may be configured to determine that the core's resources are heavily used in terms of its core-to-core bandwidth 226, various registers 228, and the core-specific cache 229. Similarly, in such an example, workload characterizer 101 may be configured to determine that workload A will heavily use floating point unit 224, core-to-core bandwidth 226, and core specific cache 229, while determining that the other resources are lightly used. Workload characterizer 101 may be configured to make similar determinations for workloads B, C and D.

Workload manager 102 may be configured to determine from a status such as core operation status 502 and a workload queue such as workload queue 504 an optimized or improved assignment of workloads to be executed on a given core. Workload manager 102 may be configured to employ any suitable scheme for optimizing the execution of workloads in a given processing entity. In one embodiment, workload manager 102 may be configured to avoid assigning more than one workload 506 with a heavy resource usage characteristic for execution by a given processing entity. In another embodiment, workload manager 102 may be configured to avoid assigning a workload 506 with a heavy resource usage characteristic for a given resource category to execution by a core whose resources for that characteristic are already heavily constrained. In another embodiment, workload manager 102 may be configured to evaluate one or more workloads 506 in workload queue 504 to avoid creating bottlenecks for execution in the processing entity. For example, given the resource status indicated in core operation status 502, and the resource requirements indicated in workloads 506, workload manager 102 may be configured to dispatch workload C or workload D before dispatching workload A or workload B, in order to provide a more efficient execution for system 100. Workload manager 102 may be configured to compare workload B to workload C; workload B and workload C both require heavy usage of the floating point unit, but workload B also demands heavy usage of the core specific cache 229. Although workload B is ahead of workload C in workload queue 504 in terms of original priority, workload manager 102 may be configured to prioritize the execution of workload C because workload B's requirement for heavy usage of the core specific cache may conflict with the available resources indicated in core operation status 502; notably, the core specific cache 229 of the core is already heavily used.

FIG. 6 is an example illustration of quantitative categorization and prioritization by workload characterizer 101 and workload manager 102. The resource usage status of a given process entity or level of system 100 may be reflected by node operation status 602. Node operation status 602 may include resource requirements of workloads already assigned to execution by processing entities. Node operation status 602 may contain fields reflecting resources such as node-to-node bandwidth 205, CPU usage 206, power usage limits 207, available system memory 204, and I/O connections 208. Node operation status 602 may contain indications of the current level of usage of each of such resources, and indications of the maximum capacity of each of such resources. For example, the current usage of $CPU_0$ may be 85%, 0% of $CPU_1$, 2 GB/s of node-to-node bandwidth, 300 watts of power usage, 384 gigabytes of available system memory, and 0.5 GB/s of an I/O connection. Workload characterizer 101 may be configured to determine node operation status 602 based upon the operation of, for example, one or more computing nodes 110. Workload characterizer 101 may be configured to create operation statuses for other processing entities of system 100.

Workload characterizer 101 may be configured to characterize one or more workloads 606 present in workload queue 604. Workload queue 604 may be a data structure configured to prioritize various workloads of system 100 pending for execution by various processing entities of system 100. Each of the entries of workload queue 604 corresponding to a given workload 606 may contain a field designating a system resource, analogous to the designations available in node operation status 602. Such designations may reflect the resource requirements of the given workload. For example, workload A may require 70% of a CPU's resources, 10 GB/s of node-to-node bandwidth, minimal power usage, 256 gigabytes of system memory, and 1.5 GB/s of an I/O connection.

Workload manager 102 may be configured to evaluate the priority of the elements of workload queue 604 in comparison to their resource requirements and the resources available for execution. Workload manager 102 may be configured to utilize any suitable prioritization mechanism to determine the most efficient use of system resources for executing the various workloads 606. In one embodiment, workload manager 102 may be configured to assign workload 606 for execution by a given processing entity based upon whether capacity exists for the workload to execute properly. For example, workload manager 102 may evaluate workload A in comparison to the available resources as indicated in node operation status 602. In such an example, workload manager 102 may be configured to determine that while the node has capacity to execute workload A in terms of CPU resources, I/O connection, and power usage—resources are not sufficiently present for workload A to execute in terms of node-to-node bandwidth and system memory. In contrast, workload manager 102 may be configured to determine that workload B and workload C may be dispatched before workload A because sufficient resources are available, as indicated in node operation status 602. In such an example, workload B may be assigned to execution by $CPU_1$ and workload C may be assigned for execution by $CPU_0$. Workload manager 102 may be configured to determine that workload D may be dispatched for execution on $CPU_0$, but not in combination with either of workload B or workload C.

Workload manager 102 may be configured, in the case of either qualitative, relative, or quantitative evaluations, to consider the original placement of workloads in a given workload queue. For example, workload B and workload C may be assigned to be executed by the core before workload D because the workloads B and C were originally placed in workload queue 504 with a higher priority than workload D.

The capacity and the units of capacity used to characterize a given resource, such as those found in FIG. 2, may vary according to the specific characteristics of system 100. Example units of capacity, maximum capacity, as well as the factors that may affect such a maximum capacity as well as usage, may be found in Tables 1 through 3, which are given below.

TABLE 1

| Resource | Capacity Units | Example Maximum Units | Factors Affecting Maximum Units |
| --- | --- | --- | --- |
| CPU Usage (per CPU - $CPU_0$, $CPU_1$, ... $CPU_N$) | Percent Utilization | 100% | clock rate; specific design; CPU idling |
| Node-to-node Bandwidth | Gigabits per second (GB/s) | 10 gbps | Interconnect technology; number of channels |
| Available System Memory | Gigabytes (GB) | 512 GB | specific design; number of modules installed |
| Power Usage Limits | Watts (W) | 600 W | Resource idling; specific design |
| I/O Connection | GB/s | 5 gbps | # of I/O channels; specific technology |

Table 1 demonstrates sample resources of a multiple node system that may be shared among the multiple nodes making up the system. Metadata for such resources may be determined by workload manager 102, and consequently such metadata may be used to prioritize operation or assignment of workloads to nodes, or of access to shared resources by such nodes.

In Table 1, CPU usage, which may be determined on a per-CPU basis, may be measured in terms of percent utilization with a maximum utilization as 100%. Factors affecting the usage and the maximum may include clock rate, the specific design of processors as well as time spent CPU idling. Node-to-node bandwidth may be measured in GB/s, with an example maximum of 10 GB/s. The factors affecting node-to-node bandwidth may include the type of technology used for interconnects, such as Infiniband or 10 gigabyte Ethernet, as well as the number of channels available. Available system memory may be measured in gigabytes, with an example maximum of 512 gigabytes. The available system memory may be affected by the specific design of system 100 as well as the number of memory modules installed. Power usage limits may be measured in watts, with 600 watts as an example maximum. Power usage limits may be affected by resource idling, resource usage, as well as the specific design of system 100. I/O connection resources may be measured in GB/s, and an example maximum I/O connection may be 5 GB/s. I/O connection resources are limited by the number of input/output channels as well as the technology used for input and output connections.

TABLE 2

| Resource | Units of Capacity | Example Maximum Units | Factors Affecting Maximum Units |
|---|---|---|---|
| Core Usage (per Core - $Core_0$, $Core_1$, ... $Core_N$) | Percent Utilization | 100% | clock rate; specific design; core idling |
| CPU-to-CPU Bandwidth | GB/s | 30 GB/s | clock rate; specific design |
| CPU-to-RAM Bandwidth | GB/s | 20 GB/s | clock rate; # of memory channels; specific design |
| Shared Cache | Megabytes (MB) | 12 MB | specific design |
| Power Usage Limits | W | 125 W | Clock Rate; source voltage; specific design; core idling |
| Translation Lookaside Buffer | # of entries | 1000 | Specific design |

Table 2 demonstrates sample resources of a processing unit that may be shared among multiple cores in a multi-core processing unit. Metadata for such resources may be determined by workload manager 102, and consequently such metadata may be used to prioritize operation or assignment of workloads to cores, or of access to shared resources by such cores.

In Table 2, core usage, which may be determined on a per core basis, may be evaluated in terms of a percent utilization, with 100% as a maximum. The factors affecting the resource usage may include the clock rate of any processors, as well as the specific design of such processors, and the amount of time the core has spent idling. CPU-to-CPU bandwidth may be measured in terms of GB/s, with 30 GB/s as an example maximum value. Clock rate and specific design of cores or processors may affect CPU-to-CPU bandwidth. CPU-to-RAM bandwidth may be measured in GB/s, with GB/s as a maximum example value. The clock rate, the number of memory channels, as well as specific designs of processor or cores may affect CPU-to-RAM bandwidth. Shared cache may be measured in megabytes, with 12 megabytes as an example maximum value. The shared cache may be affected by the specific design of processors or cores of system 100. Power usage limits may be measured in watts, with an example maximum unit of 125 watts. The clock rate, source voltage, and specific design of the processors of system 100, as well as the amount of time spent idling of a given core, may affect the usage and maximum power usage. The translation look aside buffer may be measured in a total number of entries in the buffer, with 1,000 as an example maximum. The maximum of such a buffer may be determined by the specific design of system 100.

Metadata for such resources may be determined by workload manager 102, and consequently such metadata may be used to prioritize operation of threads, or of access to shared resources by such threads.

In Table 3, floating point unit usage may be measured in terms of cycles per instruction. An example maximum amount of floating point unit operation may be 2.0 cycles per instruction period. The clock rate and specific design of system 100 may affect the usage and a maximum of floating point unit. Integer unit may be measure in cycles per instruction, with 1.5 cycles per instruction as a maximum value. Core-to-core bandwidth may be measured in GB/s, with 1,000 GB/s as a maximum value. The clock rate and specific design of system 100 may affect the maximum and usage of integer unit, as well as core-to-core bandwidth. Core specific cache may be measured in kilobytes with 128 kilobytes as an example maximum. The specific design of system 100 may affect the usage and maximum of core specific cache. Power usage limits may be measured in watts, with 25 watts as an example maximum. The clock rate source voltage and specific design of system 100 may affect the usage and maximum power usage limits, as well as the amount of time spent idling by resources of system 100. Other maximums may be particular to specific registers of system 100, and such usage as well as maximums may vary according to the nature of the specific register used to evaluate the operation of a processing entity of system 100.

In operation, workload characterizer 101 may characterize the operational and computing resource requirements of two or more workloads to be executed by one or more processing entities of system 100. Workload characterizer 101 may characterize the computing resources available for execution of such workloads. Workload characterizer 101 may thus generate workload metadata 101 and resource status 104, which may be used by workload manager 102 to assign such work-

TABLE 3

| Resource | Units of Capacity | Example Maximum Units | Factors Affecting Maximum Units |
|---|---|---|---|
| Floating Point Unit (FPU) | Cycles per Instruction (CPI) | 2.0 CPI | clock rate; specific design |
| Integer Unit (IntU) | (CPI | 1.5 CPI | clock rate; specific design |
| Core-to-core Bandwidth | GB/s | 1000 GB/s | clock rate; specific design |
| Core Specific Cache | Kilobytes (KB) | 128 KB | specific design |
| Power Usage Limits | W | 25 W | Clock Rate; source voltage; specific design; resource idling |
| Various Specific Register Units | N/A | N/A | N/A |

Table 3 demonstrates sample resources of a core that may be shared among multiple threads in a multi-threaded core.

loads to processing entities for an efficient use of available resources. Workload characterizer 101 and workload manager 102 may be running on server 105, different electronic devices, or on the same electronic device, which may be a different electronic device than server 105.

Workload characterizer 101 and workload manager 102 may evaluate workload requests, system resources, and assign workloads for execution for workloads and processing entities of a given level of system 100. For example, workload characterizer 101 and workload manager 102 may evaluate workload requests and system resources of: one or more computing nodes 110; one or more cores 114; or one or more threads 118.

Computing nodes 110 may be executing in a networked configuration or scheme, such as a cloud computing scheme. Computing nodes 110 may be assigned workloads by workload manager 102, to efficiently execute one or more such workloads while sharing some common resources. Computing nodes 110 may share resources such as available system memory 204, node-to-node bandwidth 205, CPU usage 206 of a given computing node, power usage limits 207, and/or I/O connection bandwidth 208. The amount of such resources that are available for the pool of computing nodes 110 may be characterized by workload characterizer 101. The amount of such resources required by a given workload may be characterized by workload characterizer 101.

Cores 114 may be executing on a single computing node 114. Each core 114 may share some computing resources, such as CPU 116. Workload manager 102 may assign workloads to cores 114, to efficiently execute one or more such workloads while sharing some common resources. Such resources may include CPU-to-RAM bandwidth 214, CPU-to-CPU bandwidth 215, shared cache 216, core usage 217, power usage limits 218, and/or translation look-aside buffer 219. The amount of such resources that are available for the pool of cores 114 may be characterized by workload characterizer 101. The amount of such resources required by a given workload may be characterized by workload characterizer 101.

Threads 118 may be executing on a single core 114. Each thread 118 may share some computing resources, such as core resources 120. Workload manager 102 may assign workloads to threads 114, to efficiently execute one or more such workloads while sharing some computing resources. Such resources may include floating point unit 224, integer unit 225, core-to-core bandwidth 226, power usage limits 227, various registers 228, and/or core specific cache 229. The amount of such resources that are available for the pool of threads 118 may be characterized by workload characterizer 101. The amount of such resources required by a given thread 118 may be characterized by workload characterizer 101.

Workload manager 102 may store the results of characterizing workload resource requirements in, for example, workload metadata 103, workloads 506, or workloads 606. Workload manager 102 may store the results of characterizing the available computing resources for a pool of processing entities in, for example, resource status 104, core operation status 502, or node operation status 602.

Workload manager 102 may analyze the requirements of a given workload by loading the workload on an electronic device and executing the workload. Workload manager 102 may measure the workload's use of specific resources. Workload manager 102 may record the resource usage. In one embodiment, sample data may be used to execute the workload. Workload manager 102 may execute the workload multiple times with different data, and subsequently average the resource requirements.

In one embodiment, workload manager 102 may characterize workload resource requirements and available computing resources qualitatively. In another embodiment, workload manager 102 may characterize workload resource requirements as relative to other workload resource requirements, a benchmark, or available computing resources. Workload manager 102 may characterize the needs of a given workload 506 into discrete segments or categories of usage, using one or more threshold values to divide the resource requirements into segments. For example, a CPU usage of greater than 50% may be classified as "heavy" usage, while CPU usage of less than 50% may be classified as "low" usage. Similarly, workload manager 102 may characterize the availability of resources into discrete segments or categories of usage, using one or more threshold values to divide the resource requirements into segments, such as those found in core operation status 502. For example, if the CPU resources are being used at a rate greater than 50% of capacity, the load on the resources may be classified as "heavy," while if the CPU resources are being used at a rate less than 50% of capacity, the load on the resources may be classified as "low."

In another embodiment, workload manager 102 may characterize workload resource requirements and available computing resources quantitatively. Workload manager 102 may characterize the needs of a given workload 606 into an amount of units of capacity required for the workload to execute. The way that the required amount of computing resources for a given workload 606 is described may depend upon the kind of resource required, as described above in Tables 1-3. For example, the required amount of computing resources may be given as a percentage of the available computing resources, or in standard units. To characterize a required amount of computing resources available for one or more of a pool of processing entities, workload may characterize such resources into an amount of units of capacity, such as those found in node operation status 602. The way that the available amount of computing resources for a processing entity or pool of processing entities, such as node operation status 602 may depend upon the specific resource, as described above in Tables 1-3. For example, the amount of computing resources available may be given as a percentage of the available computing resources, or in standard units.

Workload manager 102 may use the information regarding the available resources and the resources required by pending workloads of system 100 to assign one or more workloads to be executed by one or more particular processing entities. Pending workloads may reside in a queue, such as workload queues 504 and 604, or job scheduler queue 310. Processing entities may contain a queue, such as CPU job queues 304-308, into which workload manager 102 may insert a pending workload for execution. Such an insertion may be the assignment of a workload to a processing entity.

Workload manager 102 may use the information regarding the available resources for a given pool of processing entities, such as core operation status 502, node operation status 602, or resource status 102, to determine whether any of the kinds of resources available may constitute potential limiting factor, or bottleneck.

For example, in FIG. 5 workload manager 102 may use the information concerning resources required by a workload 506 at the top of workload queue 504, such as Workload A, to determine whether any of the resources heavily used by Workload A are already being heavily used by the available cores, as indicated in core operation status 502. Workload A requires heavy use of both floating point unit 234 resources, as well as heavy use of core-to-core bandwidth 226 resources. Core operation status 502 indicates that current floating point unit 224 usage is light, while core-to-core bandwidth 226 usage is heavy. Thus, workload manager 102 may determine that core-to-core bandwidth 226 is a potential bottleneck. Workload manager 102 may determine that any resources denoted as having heavy usage may be potential bottlenecks. For example, workload manager 102 may determine that current usage of various registers 228 as well as core specific cache 229 are also potential bottlenecks.

In another example, in FIG. 6 workload manager 102 may use the information concerning resources required by one or more workloads 606 in workload queue 604 to determine whether any of the resources required by the workloads 606 would exceed the available resources, as indicated by node operation status 602. Workload A may require 256 gigabytes of system memory 204 and 10 GB/s of node-to-node bandwidth 205, while the available resources for the pool of nodes as indicated by node operation status 602 may be 128 megabytes of available system memory 204 (512 megabytes maximum capacity, less 384 megabytes currently in use), and eight GB/s of available node-to-node bandwidth 205. Workload manager 102 may thus determine that application of Workload A may result in bottlenecks in resources for available system memory 204 and node-to-node bandwidth 205.

Workload manager 102 may use information regarding potential bottlenecks, computing resources available to a pool of processing entities, and the computing resources required by one or more workloads to select one or more workloads for execution on one or more processing entities.

In one embodiment, workload manager 102 may prioritize workloads based upon potential conflicts with available processing entity resources. In various embodiments, workload manager 102 may prioritize such workloads by minimizing conflicts as determined by comparing qualitative or relative evaluations of workload requirements and available system resources. For example, workload manager 102 may determine that, in FIG. 5, given core operation status 502 and workload queue 504, Workload B may be prioritized for execution over Workload A because Workload B may not be as adversely affected as Workload A by a potential bottleneck of core-to-core bandwidth 226 in the processing entity, as Workload B requires only "light" core-to-core bandwidth, while Workload A requires "heavy" core-to-core bandwidth, and the usage of such a resource is already "heavy" in the processing entity. However, since both Workload A and B also have a potential conflict with the available core specific cache 229, as Workload A and B both require "heavy" use of that resource, and the use of that resource is already "heavy" in the processing entity, workload manager 102 may prioritize Workloads C and D over Workloads A and B. Workloads C and D might not have potential conflicts with the availability of core specific cache 229, since their required use of core specific cache 229 is "light." Workload manager 102 may select Workload C for prioritization over Workload D, since Workload C appeared initially with higher priority than Workload D, and no potential bottlenecks currently appear to distinguish the requirements of Workload C and D.

In one embodiment, workload manager 102 may prioritize workloads, or assign a given workload to a given processing entity, based upon the measured resource requirements of the workload and upon the available processing resources. In such an embodiments, workload manager may prioritize or select workloads and target processing entities so as not to exceed the capacity of the various processing entities. For example, workload manager 102 may determine that, in FIG. 6, workload A might not be dispatched for execution by the CPUs of the pool of nodes represented by node operation status 602, as Workload A requires 256 GB of system memory 204 and 10 GB/s of node-to-node bandwidth 205, and only 128 GB and 8 GB/s, respectively, are available. Workload manager 102 may then determine that both Workload B and Workload C may be dispatched for execution by the pool of processing entities, because neither of such workloads' requirements would exceed the available resources in the pool of processing entities. In such a case, Workload B may be dispatched for execution on $CPU_1$, because it requires 85% of CPU resources 206, and $CPU_1$ has 100% of such resources available. Workload C may be dispatched to either $CPU_0$ or $CPU_1$, because its addition would cause neither CPU to exceed its capacity.

Figure 7:
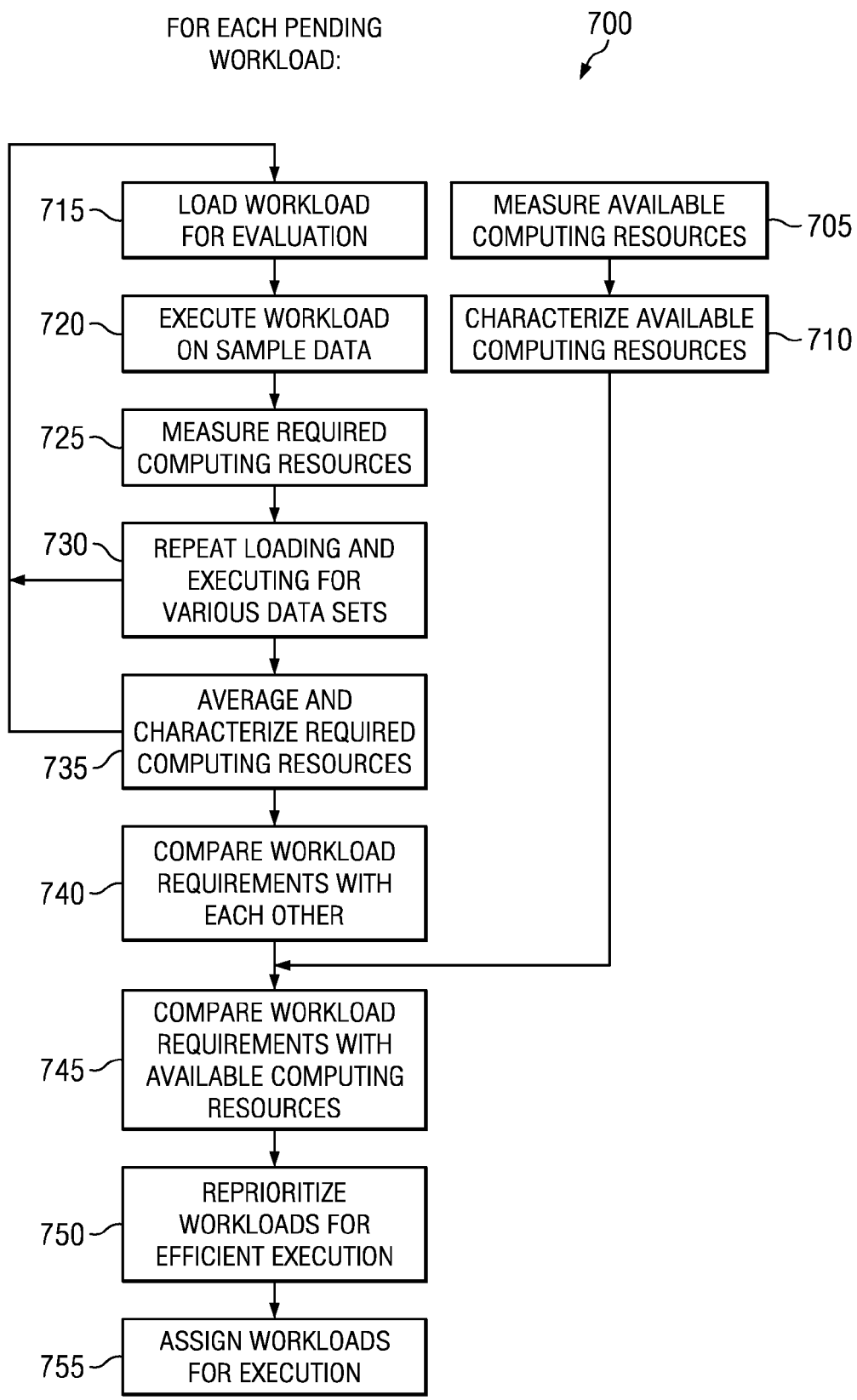
FIG. 7 is an example embodiment of a method for computing workload metadata generation, analysis, and utilization.

FIG. 7 is an example embodiment of a method 700 for computing workload metadata generation, analysis, and utilization. In step 705, the available computing resources of a system may be measured. Such resources may reflect resources to be shared, for example, between computing nodes, between cores, or between threads. In step 710, the available computing resources may be characterized. In one embodiment, the available computing resources may be characterized in a quantitative fashion. In another embodiment, such computing resources may be characterized qualitatively, or relative to, for example, a benchmark, historical amounts of computing resources, or computing resources required by various workloads.

Any suitable available computing resources, possibly affecting execution of a workload, may be measured and characterized. Such resources may vary according to the processing entity that will be executing a given workload.

In one embodiment, the available computing resources may be characterized qualitatively or relative to a benchmark, historical amounts of computing resources, or the computing resources required by various workloads. In such an embodiment, one or more thresholds may be applied to segment availability of the resource into one or more categories. For example, a 50% threshold for current CPU usage of the processing entity may be applied, above which such current usage may be categorized as "heavy," and below which such current usage may be categorized as "light." In another embodiment, the available computing resources may be characterized quantitatively. In such an embodiment, the available computing resources may be assessed as a quantity of units, percentage, or other suitable mechanism for comparison and analysis.

For one or more pending workloads, the workloads pending for execution by the processing entity, the computing resources required by workloads may be measured and characterized. In step 715, the workload may be loaded for evaluation. In step 720, the workload may be executed using sample data. In step 725, the resources required for loading the workload may be measured, as well as the required resources for execution. In step 730, steps 715-725 may be repeated for one or more sample data sets.

In step 735, the computing resources required by the workload may be averaged and characterized. In one embodiment, the required computing resources may be characterized qualitatively, or, for example, relative to the other workloads, a benchmark, or the available system resources. In such an embodiment, one or more thresholds may be applied to segment usage of the resource into one or more categories of use. For example, a 50% threshold for CPU usage may be applied, above which such usage may be categorized as "heavy," and below which such usage may be categorized as "light." In another embodiment, the required computing resources may be characterized quantitatively. In such an embodiment, the required computing resources may be assessed as a quantity of units, percentage, or other suitable mechanism for comparison and analysis.

In step 740, the workload requirements may be compared against other workload requirements. In one embodiment, the workload requirements may be ranked, according to resource usage requirements.

In step 745, the workload requirements may be compared against the available computing resources. If the workload requirements and available computing resources have been determined in a qualitative or relative fashion, then each set of requirements may be analyzed to determine whether such requirements require heavy usage of system resources, wherein the system resources are already heavily used. If the workload requirements and available computing resources have been determined in a quantitative fashion, then each set of requirements may be analyzed to determine whether such requirements would exceed the resources available.

In step 750, the workloads may be prioritized for efficient execution, based upon the comparison of workload requirements with available computing resources. In one embodiment, the workloads may also be prioritized based upon any previous designated or determined rankings or priorities. For example, if a first workload to be prioritized would exceed the available resources, a second workload, with a lower initial priority, may be reprioritized over the first workload, wherein execution of the second workload would be evaluated not exceeding the available resources. In another example, one or more bottlenecks, corresponding to available computing resources of low availability, may be identified. In such an example, workloads may be prioritized for execution based upon their requirements of the computing resources making up the bottleneck. In yet another example, if a first workload is identified as a significant consumer of an available computing resource, a second workload may be prioritized over the first, wherein the second workload has a lower consumption requirement of the computing resource. In step 755, the workloads may be assigned to a processing entity for execution, based upon the prioritization in the previous steps.

Method 700 may be implemented using the system of FIGS. 1-3, or any other system operable to implement method 700. As such, the preferred initialization point for method 700 and the order of its steps may depend on the implementation chosen. In some embodiments, some steps may be optionally omitted, repeated, or combined. For example, in the middle of the operation of method 700, a new requested workload may be received, and some of steps 715-750 may be repeated to adequately measure and analyze the metadata of the newly requested workload. In some embodiments, some steps of method 700 may be executed in parallel with other steps of method 700. For example, steps 705-710 may be executed in parallel with steps 710-740. In certain embodiments, method 700 may be implemented partially or fully in software embodied in computer-readable media.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, and other electromagnetic and/or optical carriers; and/or any combination of the foregoing.

Although the present disclosure has been described in detail, it should be understood that various changes, substitutions, and alterations can be made hereto without departing from the spirit and the scope of the disclosure as defined by the appended claims.

What is claimed is:

1. A method for managing computing resources in a computer system, comprising:
    generating a first workload metadata for a first workload;
    generating a second workload metadata for a second workload, wherein:
        the first workload metadata and the second workload metadata each specify computing resources required by the associated workload, wherein the required computing resources are specified by dividing each computing resource into discrete segments or categories of usage and identifying each computing resource required by the associated workload based on a specific category of usage;
        the first workload is initially prioritized over the second workload based on the generated workload metadatas and current availability of computing resources on the computer system; and
        the first workload and the second workload are scheduled to be assigned to and executed by one or more processing entities in a plurality of processing entities in the computer system;
    generating a resource metadata of the computer system, wherein the resource metadata specifies computing resources available on a first processing entity and a second processing entity in the plurality of processing entities, wherein the available computing resources are specified by identifying each computing resource available on the first and second processing entities based on the same categories of usage from which computing resources required by the first and second workload are generated;
    comparing the first workload metadata and the second workload metadata against the resource metadata;
    based upon the comparison of the first and second workload metadata against the resource metadata, identifying a potential conflict between the first workload metadata and the resource metadata, wherein the potential conflict is identified by determining that any of the computing resources required by the first workload would cause any of the computing resources available on the first processing entity and the second processing entity to exceed its capacity;
    reprioritizing the second workload for assignment over the first workload based on the identified potential conflict;
    determining whether the first or the second processing entity has sufficient resources to execute the second workload by comparing the second workload metadata with the resource metadata; and
    based on a determination that either the first or the second processing entity has sufficient resources to execute the second workload, assigning the second workload for execution by the first or second processing entity.

2. The method of claim 1, further comprising using one or more thresholds to divide each of the required computing resources into discrete segments or categories of usage.

3. The method of claim 1, wherein the first workload metadata and second workload metadata further comprise quantitative characterizations of the computing resources required by each workload.

4. The method of claim 3, wherein the potential conflict is identified if execution of the first workload by the first processing entity would cause the first processing entity to exceed one hundred percent of any of its available computing resources.

5. The method of claim 1, wherein the one or more processing entities comprises a pool of computing nodes.

6. The method of claim 1, wherein the one or more processing entities comprises a pool of processor cores.

7. The method of claim 1, wherein the one or more processing entities comprises a pool of processor threads.

8. The method of claim 1, wherein generating the workload metadata for a respective workload comprises:
   loading the workload into a system for execution;
   executing the workload with a first sample of data; and
   measuring the computing resources used by the workload.

9. The method of claim 8, wherein generating the workload metadata for the respective workload further comprises:
   executing the workload with a second sample of data;
   measuring the computing resources used by the workload; and
   averaging the computing resources used by the workload.

10. The method of claim 1, wherein:
    the first workload metadata includes a first requirement of a computing resource;
    the second workload metadata includes a second requirement of the computing resource;
    and the second requirement exceeds the first requirement.

11. An article of manufacture for managing computing resources in a computer system, comprising:
    a non-transitory computer readable medium; and
    computer-executable instructions carried on the non-transitory computer readable medium, the instructions readable by a processor, the instructions, when read and executed, for causing the processor to:
    generating a first workload metadata for a first workload;
    generating a second workload metadata for a second workload, wherein:
      the first workload metadata and the second workload metadata each specify computing resources required by the associated workload, wherein the required computing resources are specified by dividing each computing resource into discrete segments or categories of usage and identifying each computing resource required by the associated workload based on a specific category of usage;
      the first workload is initially prioritized over the second workload based on the generated workload metadatas and current availability of computing resources on the computer system; and
      the first workload and the second workload are scheduled to be assigned to and executed by one or more processing entities in a plurality of processing entities in the computer system;
    generating a resource metadata of the computer system, wherein the resource metadata specifies computing resources available on a first processing entity and a second processing entity in the plurality of processing entities, wherein the available computing resources are specified by identifying each computing resource available on the first and second processing entities based on the same categories of usage from which computing resources required by the first and second workload are generated;
    comparing the first workload metadata and the second workload metadata against the resource metadata;
    based upon the comparison of the first and second workload metadata against the resource metadata, identifying a potential conflict between the first workload metadata and the resource metadata, wherein the potential conflict is identified by determining that any of the computing resources required by the first workload would cause any of the computing resources available on the first processing entity and the second processing entity to exceed its capacity;
    reprioritizing the second workload for assignment over the first workload based on the identified potential conflict;
    determining whether the first or the second processing entity has sufficient resources to execute the second workload by comparing the second workload metadata with the resource metadata; and
    based on a determination that either the first or the second processing entity has sufficient resources to execute the second workload, assigning the second workload for execution by the first or second processing entity.

12. The article of claim 11, further comprising using one or more thresholds to divide each of the required computing resources into discrete segments or categories of usage.

13. The article of claim 11, wherein the first workload metadata and second workload metadata further comprise quantitative characterizations of the computing resources required by each workload.

14. The article of claim 13, wherein the potential conflict is identified by causing the processor to determine whether execution of the first workload by the first processing entity would cause the first processing entity to exceed one hundred percent of any of its available computing resources.

15. The article of claim 11, wherein the one or more processing entities comprises a pool of computing nodes.

16. The article of claim 11, wherein the one or more processing entities comprises a pool of processor cores.

17. The article of claim 11, wherein the one or more processing entities comprises a pool of processor threads.

18. The article of claim 11, wherein generating the workload metadata for a respective workload comprises:
    loading the workload into a system for execution;
    executing the workload with a first sample of data; and
    measuring the computing resources used by the workload.

19. The article of claim 18, wherein generating the workload metadata for the respective workload further comprises:
    executing the workload with a second sample of data;
    measuring the computing resources used by the workload; and
    averaging the computing resources used by the workload.

20. A system for managing computing resources in a computer system, comprising:
    a processor;
    a computer readable medium coupled to the processor; and
    computer-executable instructions carried on the computer readable medium, the instructions readable by the processor, the instructions, when read and executed, for causing the processor to:
    generating a first workload metadata for a first workload;
    generating a second workload metadata for a second workload, wherein:
      the first workload metadata and the second workload metadata each specify computing resources required by the associated workload, wherein the required computing resources are specified by dividing each computing resource into discrete segments or categories of usage and identifying each computing resource required by the associated workload based on a specific category of usage;

the first workload is initially prioritized over the second workload based on the generated workload metadatas and current availability of computing resources on the computer system; and the first workload and the second workload are scheduled to be assigned to and executed by one or more processing entities in a plurality of processing entities in the computer system;

generating a resource metadata of the computer system, wherein the resource metadata specifies computing resources available on a first processing entity and a second processing entity in the plurality of processing entities, wherein the available computing resources are specified by identifying each computing resource available on the first and second processing entities based on the same categories of usage from which computing resources required by the first and second workload are generated;

comparing the first workload metadata and the second workload metadata against the resource metadata;

based upon the comparison of the first and second workload metadata against the resource metadata, identifying a potential conflict between the first workload metadata and the resource metadata, wherein the potential conflict is identified by determining that any of the computing resources required by the first workload would cause any of the computing resources available on the first processing entity and the second processing entity to exceed its capacity;

reprioritizing the second workload for assignment over the first workload based on the identified potential conflict;

determining whether the first or the second processing entity has sufficient resources to execute the second workload by comparing the second workload metadata with the resource metadata; and based on a determination that either the first or the second processing entity has sufficient resources to execute the second workload, assigning the second workload for execution by the first or second processing entity.

21. The system of claim 20, further comprising using one or more thresholds to divide each of the required computing resources into discrete segments or categories of usage.

22. The system of claim 20, wherein the first workload metadata and second workload metadata further comprise quantitative characterizations of the computing resources required by each workload.

23. The system of claim 22, wherein the potential conflict is identified by causing the processor to determine whether execution of the first workload by the first processing entity would cause the first processing entity to exceed one hundred percent of any of its available computing resources.

24. The system of claim 20, wherein the one or more processing entities comprises a pool of computing nodes.

25. The system of claim 20, wherein the one or more processing entities comprises a pool of processor cores.

26. The system of claim 20, wherein the one or more processing entities comprises a pool of processor threads.

27. The system of claim 20, wherein generating the workload metadata for a respective workload comprises:
loading the workload into a system for execution;
executing the workload with a first sample of data; and
measuring the computing resources used by the workload.

28. The system of claim 20, wherein generating the workload metadata for the respective workload further comprises:
executing the workload with a second sample of data;
measuring the computing resources used by the workload; and
averaging the computing resources used by the workload.

* * * * *